United States Patent
Zhang et al.

(10) Patent No.: US 11,113,654 B2
(45) Date of Patent: Sep. 7, 2021

(54) OBJECT REGISTRATION

(71) Applicant: SAP SE, Walldorf (DE)

(72) Inventors: Yundong Zhang, Shanghai (CN); Qinhe Lin, Shanghai (CN); Yutao Ren, Shanghai (CN); Hanmei Zhang, Shanghai (CN)

(73) Assignee: SAP SE, Walldorf (DE)

( * ) Notice: Subject to any disclaimer, the term of this patent is extended or adjusted under 35 U.S.C. 154(b) by 700 days.

(21) Appl. No.: 14/979,604

(22) Filed: Dec. 28, 2015

(65) Prior Publication Data

US 2017/0185926 A1 Jun. 29, 2017

(51) Int. Cl.
*G06Q 10/06* (2012.01)
*G06F 16/23* (2019.01)

(52) U.S. Cl.
CPC .......... *G06Q 10/067* (2013.01); *G06F 16/23* (2019.01); *G06Q 10/06313* (2013.01)

(58) Field of Classification Search
CPC ........ G06Q 10/00; G06Q 10/06; G06Q 99/00; G06F 9/44; G06F 17/00; G06F 17/30; G06F 17/50; G06F 15/17; G06F 9/445; H04L 12/24
USPC ......... 705/7.23, 7.25, 7.41, 7.13, 7.27, 7.28; 707/758; 717/102, 178; 706/12; 709/223
See application file for complete search history.

(56) References Cited

U.S. PATENT DOCUMENTS

| | | | |
|---|---|---|---|
| 6,347,398 B1 * | 2/2002 | Parthasarathy | G06F 8/60 707/999.202 |
| 2002/0069083 A1 * | 6/2002 | Harter | G06N 5/025 705/348 |
| 2002/0147622 A1 * | 10/2002 | Drolet | G06Q 10/06 705/7.25 |
| 2006/0143231 A1 * | 6/2006 | Boccasam | G06F 17/30507 |
| 2007/0150330 A1 * | 6/2007 | McGoveran | G06Q 30/0201 705/7.13 |
| 2007/0198312 A1 * | 8/2007 | Bagchi | G06Q 10/06 705/7.41 |
| 2008/0059279 A1 * | 3/2008 | Goldschneider | G06Q 10/10 705/7.37 |
| 2008/0312980 A1 * | 12/2008 | Boulineau | G06Q 10/06 705/7.13 |
| 2008/0313008 A1 * | 12/2008 | Lee | G06Q 10/06 705/7.23 |

(Continued)

*Primary Examiner* — Cory W Eskridge
(74) *Attorney, Agent, or Firm* — Klarquist Sparkman, LLP

(57) ABSTRACT

A framework for object registration, and in particular for registering and executing calculation models and business rules, is described herein. In one embodiment, metadata definitions and input/output Application Program Interfaces (APIs) define uniform conventions that, when followed by a customized calculation model or business rule, allow transparent execution of pre-defined as well as customized calculation models and business rules. In one embodiment, a customized calculation model is registered with a stored procedure and a metadata table. In another embodiment, business rules are registered with a stored procedure and type information. By following the uniform conventions, initial processing is enabled with pre-defined calculation models or business rules, while subsequent processing is seamlessly enabled with customized calculation models or business rules.

20 Claims, 3 Drawing Sheets

(56) References Cited

U.S. PATENT DOCUMENTS

| | | | | |
|---|---|---|---|---|
| 2008/0313110 A1* | 12/2008 | Kreamer | ............... | G06Q 10/06 706/12 |
| 2009/0125359 A1* | 5/2009 | Knapic | ................. | G06F 9/542 705/7.23 |
| 2013/0282746 A1* | 10/2013 | Balko | ................... | G06Q 10/06 707/758 |
| 2013/0290067 A1* | 10/2013 | Barton | ................. | G06Q 10/06 705/7.28 |
| 2014/0075004 A1* | 3/2014 | Van Dusen | ............ | H04L 41/04 709/223 |
| 2015/0293764 A1* | 10/2015 | Visvanathan | ............ | G06F 8/36 717/102 |

* cited by examiner

| APRIL_LOC_PLAN 204 | Details 206 | Scheduling 208 | Where Used 210 | |
|---|---|---|---|---|
| Type: Scheduled Supply and Demand Plan<br><br>Created On: 2016-11-17<br><br>Last Changed By: TRPADM | Location Filter: APRIL_LOC_FILTER<br><br>Resource Filter: GENERALTYPES<br><br>Time Filter: FUTURE01<br><br>Calculation Module 212: DFT_SD_CM<br><br>Rule Group 214: DFT_SD_AR_GRP | | | |
| | | | User Interface (UI) 202 | |

OBJECT REGISTRATION

BACKGROUND

Complex software packages often are delivered to customers with pre-defined software components. For example, resource planning software delivers a set of calculation models and business rules to support resource visibility and optimization.

Calculation models are mathematical models used to compute supply and demand quantities of resources or resource performance indicators. Calculation models are generated and processed by an application function modeler component. In one embodiment, calculation models are defined as a flowgraph which models a data flow. For example, the data flow may contain tables, views, and procedures from a catalog (e.g., from a database), relational operators such as projection, filter, union, and join, built in functions, and attribute view and calculation view development objects, or the like.

Business rules describe constraints on the behavior of the business. Business rules represent the core business logic of each organization; they guide and control the basic business processes that form the backbone of any business transaction, setting standard business practices or policies that need to be applied consistently across business activities. Examples of business rules include 'Loan Product Eligibility Guidelines', 'Product Configuration Rules', etc. Business rules are processed by a rule framework component.

However, calculation models and business rules are often inadequate or sub-optimal, as a given customer's actual resource usage will differ from assumptions embedded in the pre-defined software components. Often, business users would like to customize the pre-defined calculation models and business rules, or create their own. However, integrating user-defined calculation models and business rules into resource planning software has proved challenging.

Therefore, there is a need for an improved framework that addresses the abovementioned challenges.

SUMMARY

Disclosed is a framework for object registration, and in particular for registering and executing calculation models and business rules. In one embodiment, metadata definitions and input/output Application Program Interfaces (APIs) define uniform conventions that, when followed by a customized calculation model or business rule, allow transparent execution of pre-defined as well as customized calculation models and business rules. In one embodiment, a customized calculation model is registered with a stored procedure and a metadata table. In another embodiment, business rules are registered with a stored procedure and type information. By following the uniform conventions, initial processing is enabled with pre-defined calculation models or business rules, while subsequent processing is seamlessly enabled with customized calculation models or business rules.

In one embodiment, the uniform conventions include semantic information, index information, flow graph layout information, and identification information. In one embodiment, an integration workbench enables pre-defined and customized "calculation models" and "business rules" to work together seamlessly.

While the following discussion typically involves the registration of calculation models and business rules, one of ordinary skill in the art would recognize that these are but two types of customizable software components distributed in a resource planning software package, and that other types of customizable software components containing one or more uniform conventions are similarly contemplated. Likewise, while resource planning software is often used as an example in this document, other types of complex software containing user customizable software components are similarly contemplated.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 2 illustrates an exemplary user interface for selecting a customized calculation module and a customized business rule.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

Figure 1:
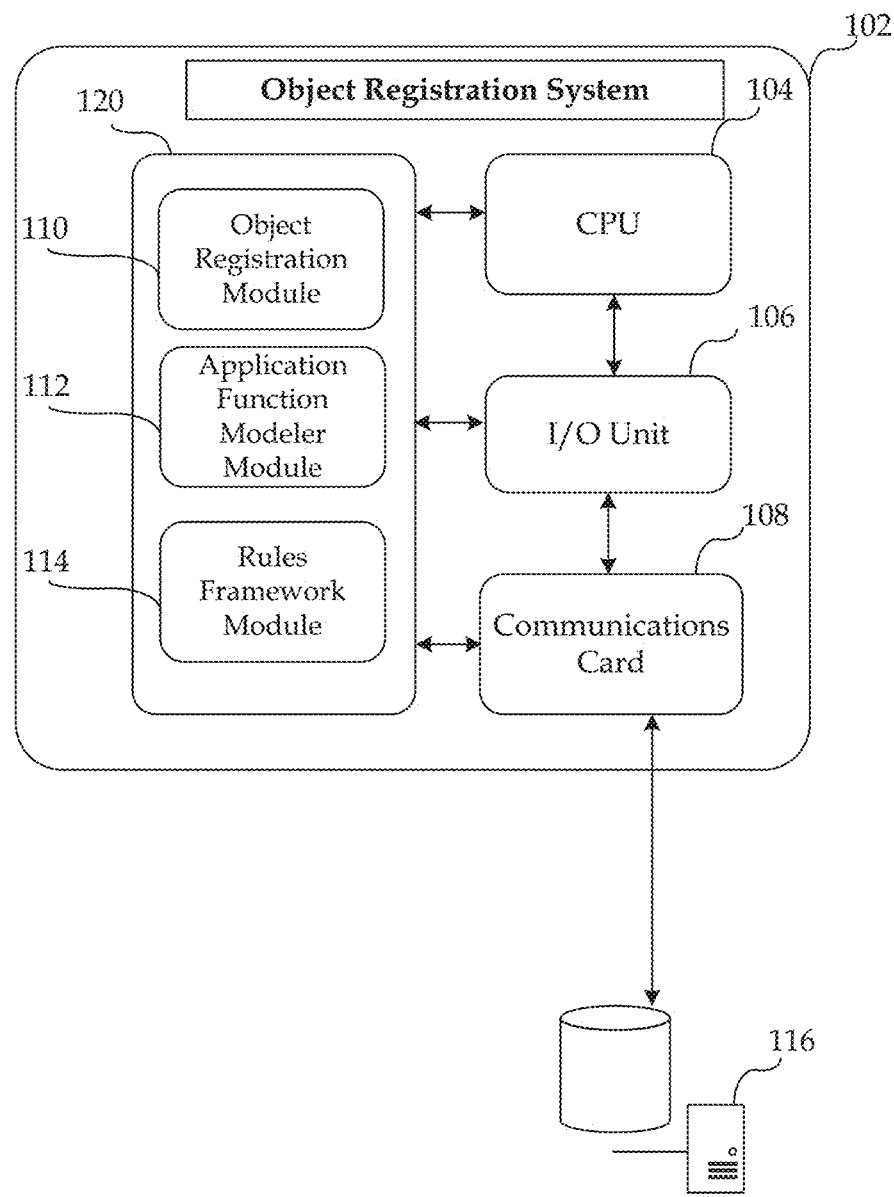
FIG. 1 is a block diagram illustrating an exemplary architecture.

FIG. 1 is a block diagram illustrating an exemplary architecture 100 that may be used to implement object registration as described herein. Generally, architecture 100 may include an object registration system 102 and a data repository 116.

The object registration system 102 can be any type of computing device capable of responding to and executing instructions in a defined manner, such as a workstation, a server, a portable laptop computer, another portable device, a touch-based tablet, a smart phone, a mini-computer, a mainframe computer, a storage system, a dedicated digital appliance, a device, a component, other equipment, or a combination of these. The system may include a central processing unit (CPU) 104, an input/output (I/O) unit 106, a memory module 120 and a communications card or device 108 (e.g., modem and/or network adapter) for exchanging data with a network (e.g., local area network (LAN) or a wide area network (WAN)). It should be appreciated that the different components and sub-components of the system may be located on different machines or systems. Memory module 120 may include object registration module 110, application function modeler module 112, and rules framework module 114.

The object registration system 102 may be communicatively coupled to one or more other computer systems or devices via the network. For instance, the system may further be communicatively coupled to one or more data repository 116. The data repository 116 may be, for example, any database (e.g., relational database, in-memory database, etc.). The data repository 116 may also be referred to as a catalog, and may contain tables, views, stored procedures, and the like.

Object registration module 110 includes a logic for receiving and processing user input related to defining and selecting calculation models and business rules. In one embodiment, object registration module 110 receives a customized calculation model for registration, wherein the customized calculation model follows a convention defined by a corresponding pre-defined calculation model. Additionally or alternatively, object registration model 110 receives a customized business rule for registration, wherein the customized business rule follows a convention defined by a pre-defined business rule.

Application function modeler module 112 includes a logic for displaying, editing, and generating calculation models. Examples of calculation models include "Supply and Demand with Stock", which calculates supply and demand quantities, and which shows stock quantities (i.e., how much of the tracked good is available). Another example includes "Idle Rate Pipeline," which calculates the idle rate of consumption of stock over a time window. Another example of a pre-defined calculation model includes "Import Export Volume Performance Indicator Pipeline", which calculates the import/export balance over a time window.

In one embodiment, calculation models are defined by flowgraphs, each flowgraph including one or more nodes. Nodes are functional elements in a flowgraph. In one embodiment, the calculation model contains two kinds of nodes: a data provider node and a data operator node. However, other node types are similarly contemplated.

In one embodiment, a data provider node is a node that provides the data for the calculation model. For example, when modeling the flow of goods, a calculation model may take as input supply data from returning transportation units (e.g., trucks, planes, bicycles returning to a warehouse). In this scenario, the node that provides this supply data is regarded as a data provider node. A data operator node may, for example, perform an operation on data, such as union, filter, and forecast, that was provided by a data provider node. Each node is bound to a runtime object. The runtime object can be a stored procedure, a calculation view, a physical table, or the like.

Rules framework module 114 includes a logic for displaying, editing, and generating business rules. Rules framework 114 provides a set of tools enabling business users and application developers to build decision logic based on the organization's data. This rule engine applies rules and actions as defined by end users.

FIG. 2 illustrates a user interface 200 for selecting a customized calculation module and a customized business rule. FIG. 2 depicts a user interface 202, which in some embodiments is implemented by object registration system 102. FIG. 2 depicts menu 204, which in this embodiment displays information relevant to plan APRIL_LOC_PLAN, which is a scheduled supply and demand plan created on Nov. 17, 2016, by TRPADM.

FIG. 2 illustrates a top menu containing menu items: Details 206 (currently selected), Scheduling 208, and Where Used 210. The menu Details 206 lists additional information about APRIL_LOC_PLAN 204, such as location, resource, and time filters. Additionally, Details 206 lists the calculation module 212 currently associated with the plan, e.g., DFT_SD_CM, along with Rule Group 214, e.g., DFT_SD_AR_GRP. End users are enabled through this interface to select a different calculation model, including customized calculation models as described herein, along with customized business rules (here via a business rule group 214 that contains constituent business rules). In this way, end users, e.g., business users, are able to manage and automate business decisions recursively and agilely with minimum information technology (IT) efforts.

Figure 3:
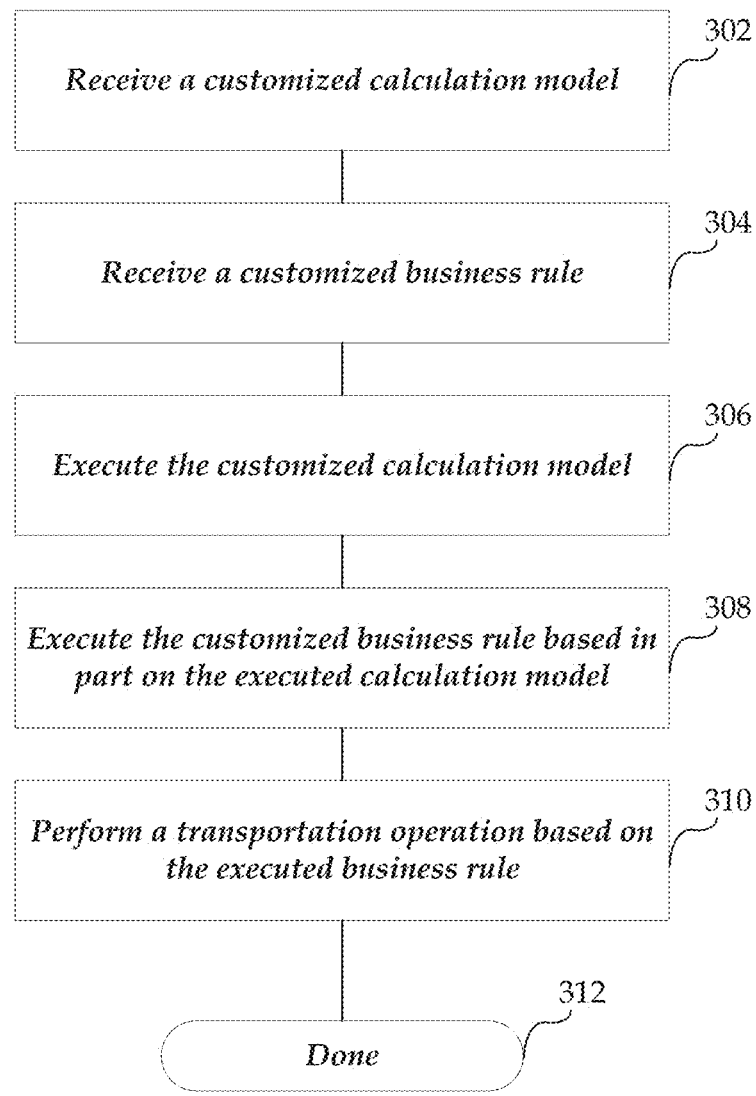
FIG. 3 is a flow chart illustrating one embodiment of object registration.

FIG. 3 is a flow chart 300 illustrating one embodiment of object registration. The process may be performed automatically or semi-automatically by the object registration system 102, described above with reference to FIG. 1.

At block 302, a custom calculation model is received. In one embodiment, a custom calculation model is received via a selection by an end user from a list. In one embodiment, a custom computation model is registered based on a database identifier (ID) (e.g., primary key) associated with a stored procedure and a database ID associated with a metadata table, where the stored procedure and the metadata table define the custom calculation module. The received database IDs are stored in a calculation model table, stored, for example, in data repository 116. In one embodiment, calculation models are mathematical models, and are defined as flowgraphs.

Custom calculation models adhere to conventions that correspond to pre-defined calculation models. For example, in the field of transportation resource planning, the calculation rule "Supply and Demand with Stock" calculates supply and demand of goods and services of a particular organization, and also shows quantities of stock at a given location. Another calculation model is "Idle Rate Pipeline", which calculates the idle rate of resources in a past time window. Each of these pre-defined calculation models, among many others not described here, may be augmented, replaced, or added to with a custom calculation model.

For example, an end user may augment a "Supply and Demand with Stock" calculation model to incorporate weather information. By replacing the pre-defined calculation model with the custom calculation model, greater predictive accuracy may be achieved. Substitution of the custom calculation model for the pre-defined calculation model is possible by adhering to the convention of the pre-defined calculation model.

In one embodiment, to conform to a convention for calculation models, each data provider associated with a calculation model returns one or more of: NodeID, LocationID, ResourceType, TimeInterval, OutputKey, and OutputValue. NodeID, which may be a serial number, Globally Unique Identifier (GUID), or the like, identifies the output content, and is used to identify the node in a flowgraph. LocationID indicates a geographic location associated with the calculation model output, e.g., an address, latitude and longitude coordinates, and the like. ResourceType indicates type of the output content. TimeInterval indicates a date/time range over which the output content applies. OutputKey indicates what kind(s) of data OutputData contains. In one embodiment related to transportation resource planning, OutputKey may return Supply, Demand, Stock, Rate, or Quantity, where Supply, Demand, and Stock are utilized in a supply and demand calculation model, while Rate and Quantity are used in a key performance indicator (KPI) calculation model. OutputValue contains the actual value(s) returned by the calculation model.

In one embodiment, a custom computation module may be unregistered. Typically, before unregistration is allowed to occur, a usage check is performed to determine if any other software components, e.g., any business rules, depend on the calculation model. Dependencies are checked in a "where used" list, which, for an object, holds a list of list of dependencies, e.g., business rules, that hold a reference to that object.

At block 304, a custom business rule is received. The custom business rule is user defined, and is identified by a database ID associated with a stored procedure and type information, such as a "RuleTypeID". In another embodiment, the custom business rule is identified by a stored procedure and purpose information.

In one embodiment, custom business rules adhere to a convention matching a pre-defined business rule. In this way, use of a custom business rule may be substituted for the pre-defined business rule. As such, end users are enabled to customize business rules, without otherwise affecting the system processing. In one embodiment, custom business rules match a RuleType, RuleTypeID, RuleTypeDescription, and RuleNamePrefix associated with a pre-defined business rule.

For example, in transportation resource planning, one pre-defined business rule is a supply and demand alert rule, which is used to trigger alerts for critical stock, supply, and demand situations. For example, one pre-defined business rule may determine an amount of stock on hand today. Other pre-defined business rules may forecast supply, forecast demand, identify key performance indicator quantities and rates, and the like. Other pre-defined business rules include performance indicator rules, stock alert rules, stock status rules, and the like. Any and all of these pre-defined business rules may be augmented or replaced by a customized business rule, as long as the customized business rule adheres to a convention associated with a pre-defined business rule.

In one embodiment, by adhering to conventions, custom calculation models may be consumed interchangeably by business rules, such that the output of a custom calculation model may be used as input to a business rule in lieu of the output of a pre-defined calculation model.

In one embodiment, business rules may be organized into business rule groups. A business rule group is a set of business rules that are regarded as unique in the front-end display and the back-end calculation. A user may be enabled, through a user interface (UI), to create a business rule group, assign business rules to the business rule group, remove business rules from the business rule group, and the like.

In one embodiment, custom business rules may be unregistered. Similar to custom calculation models, custom business rule usage is tracked in a "where used" table, which may be the same or a different table from the "where used" table that tracks custom calculation models. In one embodiment, a "where used" table may track which business rule groups refer to a given business rule.

Benefits achieved by the aforementioned embodiments include allowing customers to define which column(s) in a business rule is more or most crucial, or which column(s) are less crucial. Additionally or alternatively, customers are enabled to delete columns from a range of fields in a business rule.

At block 306, the customized calculation model is executed (i.e., evaluated), generating an output for consumption by block 308, where a customized business rule is executed to generate a second output. At block 310, the second output is used to determine whether to perform a resource planning operation. For example, at block 310, transportation resources may be re-routed, canceled, augmented, or otherwise altered. Distribution centers may alter their operation based on the second output, e.g., holding, canceling, and/or re-directing product shipments.

At block 312, the process 300 ends.

What is claimed is:

1. A computer-implemented method of registering custom software components, comprising:
   receiving a customized calculation model to replace a pre-defined calculation model, the customized calculation model sharing one or more output properties of the pre-defined calculation model, wherein the customized calculation model comprises one or more flowgraphs respectively having one or more nodes different from the pre-defined calculation model, the nodes comprising a data provider node and a data operator node, wherein the data provider node augments the pre-defined calculation model by incorporating additional information into the customized calculation model;
   registering the customized calculation model by associating a first database identifier with a stored procedure and an entry in a metadata table, wherein the stored procedure and the entry in the metadata table define the customized calculation model via the first database identifier, wherein registering the customized calculation model comprises respectively binding one or more runtime objects to the respective one or more nodes of the one or more flowgraphs;
   receiving a customized business rule to replace a pre-defined business rule, the customized business rule sharing one or more input properties of a pre-defined business rule;
   registering the customized business rule by associating a second database identifier with a second stored procedure and a type information, wherein the second stored procedure and the type information identify the customized business rule via the second database identifier and wherein the one or more shared output properties of the registered customized calculation model corresponds to the one or more shared input properties of the registered customized business rule;
   executing, based on the customized calculation model being selected in a user interface to replace the pre-defined calculation model being displayed in the user interface, the registered customized calculation model via the bound one or more runtime objects of the one or more nodes of the respective one or more flowgraphs to generate a customized calculation model output;
   executing, based on the customized business rule being selected in the user interface to replace the pre-defined business rule being displayed in the user interface, the registered customized business rule, using the generated customized calculation model output as an input, to generate a second output; and
   performing a resource planning operation based on the second output.

2. The computer-implemented method of claim 1, wherein the customized calculation model is created in part based on information derived from executing the pre-defined calculation model.

3. The computer-implemented method of claim 1, wherein the customized business rule is created in part based on information derived from executing the pre-defined business rule.

4. The computer-implemented method of claim 1, wherein the shared one or more properties includes one or more of semantic information, index information, flow graph layout information, or scenario identification information.

5. The computer-implemented method of claim 1, wherein the one or more input properties includes one or more of rule type information, semantic information, alert score calculation information, and rule assignment information.

6. The computer-implemented method of claim 1, wherein each of the customized calculation model and the customized business rule are associated with a runtime reference, administrative information, and type information.

7. The computer implemented method of claim 1, further comprising:
associating the customized business rule with a business rule group.

8. A computing apparatus facilitating generating a predictive analytics user interface, the computing apparatus comprising:
a processor; and
a memory storing instructions that, when executed by the processor, configures the apparatus to:
receive a customized calculation model via a selection by an end user from a list comprising the customized calculation model and a predefined calculation module model, the customized calculation model sharing one or more output properties of the pre-defined calculation model, wherein the customized calculation model comprises one or more flowgraphs respectively having one or more nodes different from the pre-defined calculation model, the nodes comprising a data provider node and a data operator node,
register the customized calculation model by associating a first database identifier with a stored procedure and an entry in a metadata table, wherein registering the customized calculation model comprises respectively binding one or more runtime objects to the respective one or more nodes of the one or more flowgraphs,
receive a customized business rule, the customized business rule sharing one or more input properties of a pre-defined business rule,
register the customized business rule by associating a second database identifier with a second stored procedure and a type information, and wherein the one or more shared output properties of the registered customized calculation model corresponds to the one or more shared input properties of the registered customized business rule,
execute the customized calculation model via the bound one or more runtime objects of the one or more nodes of the respective one or more flowgraphs to generate a customized calculation model output,
execute the customized business rule, using the generated customized calculation model output as an input, to generate a second output, and
perform a resource planning operation based on the second output.

9. The computing apparatus of claim 8, wherein the customized calculation model is assigned the same database table identifier as the pre-defined calculation model.

10. The computing apparatus of claim 8, wherein the customized calculation model and the customized business rule are associated with a plan.

11. The computing apparatus of claim 8, wherein the received customized calculation and the received customized business rule are registered.

12. The computing apparatus of claim 8, wherein the pre-defined business rule includes a pre-defined condition that triggers an alert, and wherein the customized business rule includes a customized condition that triggers an alert.

13. The computing apparatus of claim 8, wherein the type information matches a second type information associated with the pre-defined business rule.

14. The computing apparatus of claim 8, wherein the customized business rule is associated with a rule group, and wherein the rule group is associated with a plan, further comprising:
executing the plan by applying the customized business rule to a data set and identifying trigger conditions defined by the customized business rule.

15. A non-transitory computer-readable storage medium facilitating generating a predictive analytics user interface, the computer-readable storage medium including instructions that when executed by a computer, cause the computer to:
receive a customized calculation model comprising one or more flowgraphs respectively having a plurality of nodes different from a pre-defined calculation model, the customized calculation model sharing one or more output properties of the pre-defined calculation model, wherein a first given node of the plurality of nodes comprises a data provider node and a second given node of the plurality of nodes comprises a data operator node, and wherein the plurality of nodes adhere to a convention of the pre-defined calculation model;
register the customized calculation model by associating a first database identifier with a stored procedure and an entry in a metadata table, wherein registering the customized calculation model comprises respectively binding a plurality of runtime objects to the respective plurality of nodes of the one or more flowgraphs;
receive a customized business rule, the customized business rule sharing one or more input properties of a pre-defined business rule;
register the customized business rule by associating a second database identifier with a second stored procedure and a type information, and wherein the one or more shared output properties of the customized calculation model corresponds to the one or more shared input properties of the customized business rule;
execute, based on the customized calculation model being selected in a user interface to replace the pre-defined calculation model being displayed in the user interface, the customized calculation model via the bound one or more runtime objects of the plurality of nodes of the respective one or more flowgraphs to generate a customized calculation model output, wherein executing the customized calculation model comprises providing data to the customized calculation model by executing a first runtime object of the plurality of runtime objects bound to the data provider node and operating on the provided data by executing a second runtime object of the plurality of runtime objects bound to the data operator node, wherein the second runtime object comprises a stored procedure, and the data operator node performs a union, filter, or forecast operation;
execute, based on the customized business rule being selected in the user interface to replace the pre-defined business rule being displayed in the user interface, the customized business rule, using the generated customized calculation model output as an input, to generate a second output; and perform a resource planning operation based on the second output.

16. The non-transitory computer-readable storage medium of claim 15, wherein the customized calculation model is created in part based on information derived from executing the pre-defined calculation model.

17. The non-transitory computer-readable storage medium of claim 15, wherein the customized business rule is created in part based on information derived from executing the pre-defined business rule.

18. The non-transitory computer-readable storage medium of claim 15, wherein the shared one or more properties includes one or more of semantic information, index information, flow graph layout information, or scenario identification information.

19. The non-transitory computer-readable storage medium of claim 15, wherein the one or more input properties includes one or more of rule type information, semantic information, alert score calculation information, and rule assignment information.

20. The non-transitory computer-readable storage medium of claim 15, wherein each of the customized calculation model and the customized business rule are associated with a runtime reference, administrative information, and type information.

* * * * *